(12) United States Patent
Robison

(10) Patent No.: US 7,213,242 B2
(45) Date of Patent: May 1, 2007

(54) RUN-TIME BEHAVIOR PRESERVING PARTIAL REDUNDANCY ELIMINATION

(75) Inventor: Arch Robison, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 649 days.

(21) Appl. No.: 10/331,348

(22) Filed: Dec. 31, 2002

(65) Prior Publication Data
US 2004/0128659 A1 Jul. 1, 2004

(51) Int. Cl.
 *G06F 9/45* (2006.01)
(52) U.S. Cl. .................................... 717/151
(58) Field of Classification Search .............. None
See application file for complete search history.

(56) References Cited

U.S. PATENT DOCUMENTS

| | | | | |
|---|---|---|---|---|
| 5,790,867 A | * | 8/1998 | Schmidt et al. | 717/155 |
| 6,044,221 A | | 3/2000 | Gupta et al. | 395/709 |
| 6,857,060 B2 | * | 2/2005 | Elias et al. | 712/217 |
| 6,993,754 B2 | * | 1/2006 | Freudenberger et al. | 717/153 |

OTHER PUBLICATIONS

Thomas VanDrunen et al., "Anticipation-based partial redundancy elimination for static single assignment form", Sep. 23, 2002, Software—Practice and Experience, pp. 1-10.*
By Bodik, Rastislav, "Path-Sensitive, Value-Flow Optimizations of Programs", University of Pittsburg, 1999, pp. 78-97, "http://ww-wlib.umi.com/dissertations/order_pickup/prod/de7dbab5b24723f8882ceb8066e778a/7460047/7136749/9957708.PDF".*

Scholz et al., "Partial Redundancy Elimination with Prediction Techniques" Internet Article, 'Online', May 29, 2003, pp. 1-9, XP 002297563, retrieved from: http://www.cs.uvic.ca/(nigelh/Publications/EuroPar03.pdf> on Sep. 22, 2004.
Schlansker, et al., "Achieving High Levels of Instruction-Level Parallelism with Reduced Hardware Complexity," HP Laboratories Technical Report Feb. 1997 Hewlett Packet Lab Technical Publ. Dept., Palo Alto, CA USA, No. 96-120, Feb. 1997, pp. 1-85, XP002297565, p. 41, lines 3-9, and p. 26, line 12-p. 27, line 15.
Dulong, et al., "An Overview of the Intel IA-64 Compiler," Intel Technology Journal, Internet Article, Nov. 22, 1999, pp. 1-15, XP002297566, http://developer.intel.com/technology/itj/q41999/pdf/compiler.pdf, retrieved on Sep. 22, 2004, p. 9, line 24-p. 11, line 14 and p. 11, line 23-p. 12, line 42.
Muchnick S., "Advanced Compiler Design and Implementation," 1997, Morgan Kaufman Publishers, San Francisco, CA, ISBN: 1-55860-320-4, section 12.4.2, p. 414, lines 15-17.
PCT International Search Report performed by European Patent Office, mailed Nov. 4, 2004.
Thomas VanDrunen, "A Robust Algorithm for Partial Redundancy Elimination in Static Single Assignment Form", Computer Science, Purdue University, MSPLS 2002, vandrutj@cs.purdue.edu.
Thomas VanDrunen, "Uniting Global Value Numbering and Partial Redundancy Elimination", Computer Science, Purdue University, Summer 2002.

* cited by examiner

*Primary Examiner*—Wei Zhen
*Assistant Examiner*—Chih-Ching Chow
(74) *Attorney, Agent, or Firm*—Sanjay S. Gadkari

(57) ABSTRACT

An arrangement is provided for eliminating partial redundancy. Original code is processed to perform run-time behavior preserving redundancy elimination. Partial redundancy is removed in a manner so that the run-time behavior of the original code is preserved.

19 Claims, 16 Drawing Sheets

RUN-TIME BEHAVIOR PRESERVING PARTIAL REDUNDANCY ELIMINATION

BACKGROUND

Partial redundancy elimination (PRE) permits partially redundant expressions to be removed from a program. This is illustrated in FIG. 1(a) (Prior Art) and FIG. 1(b) (Prior Art). FIG. 1(a) demonstrates a typical PRE problem. In a control flow graph 100, there are four occurrences of expression h(x). For simplicity, these four occurrences are assumed to compute the same value and have no other side effects. The expression h(x) at node 7 is fully redundant because at that point h(x) has already been computed previously either at node 4 or at node 5. The expression at node 9 is partially redundant because at that point h(x) may have been computed along a path from node 1 to node 8 or not computed along a path from node 1 to node 2.

A conventional method to remove redundancy is illustrated in FIG. 1(b). To eliminate the full redundancy identified at node 7, the value of the expression h(x) computed at either node 4 or node 5 is assigned to a temporary variable t. At node 7, the computation of h(x) is replaced by t. To remove the partial redundancy at node 9, an instance of expression h(x) is inserted and saved in temporary variable t. The insertion makes the expression h(x) at node 9 fully redundant, and so its computation of h(x) is replaced by a use of temporary variable t.

The problem associated with the conventional solution to partial redundancy elimination is that it changes the run-time behavior of the original code. If the computation of h(x) throws an exception or never terminates, the upward movement of h(x) may cause the underlying code to behave differently. For instance, if h(x) throws an exception A and h(x) is moved upwards before another computation that throws an exception B. The transformation will now cause the code to throw exception A instead of B. For the same reason, downward movement may also cause similar changes in run-time behavior. For this reason, the conventional solution often cannot be used in environments that demand preservation of exception behavior.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 2:
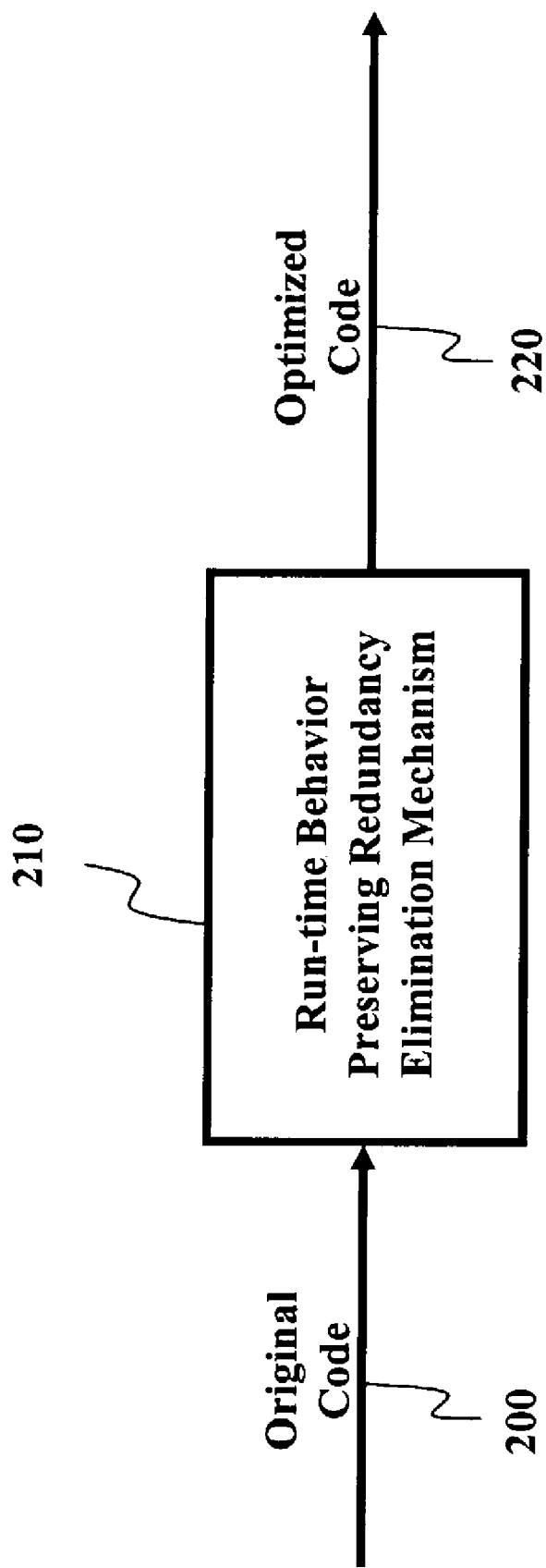
FIG. 2 depicts run-time behavior preserving redundancy elimination, according to embodiments of the inventions.

FIG. 2 depicts run-time behavior preserving redundancy elimination, according to the inventions. A run-time behavior preserving redundancy elimination mechanism 210 takes original code 200 as input and removes the redundancy in the original code 200 to produce optimized code 220 in a manner so that the run-time behavior of the original code 200 is preserved. The original code 200 may be developed in a programming language such as Pascal, Visual Basic, C, and JAVA™. Variants of the C language may also be included such as C++, Borland C, and C#.

The original code 200 may include different variable declarations, structure definitions, and various statements. A statement may use definitions such as a variable or a function. A statement may also compute the value of one or more variables. For example, an assignment statement may compute the value of a particular variable. A different assignment statement may assign a constant to an entire array. Redundancy in the original code 200 may exist when a same value is computed more than once along a path in a control flow graph associated with the original code 200. Full redundancy exists when a value to be computed has been previously computed for certain. Partial redundancy exists when a value to be computed may have been computed previously.

Figure 3:
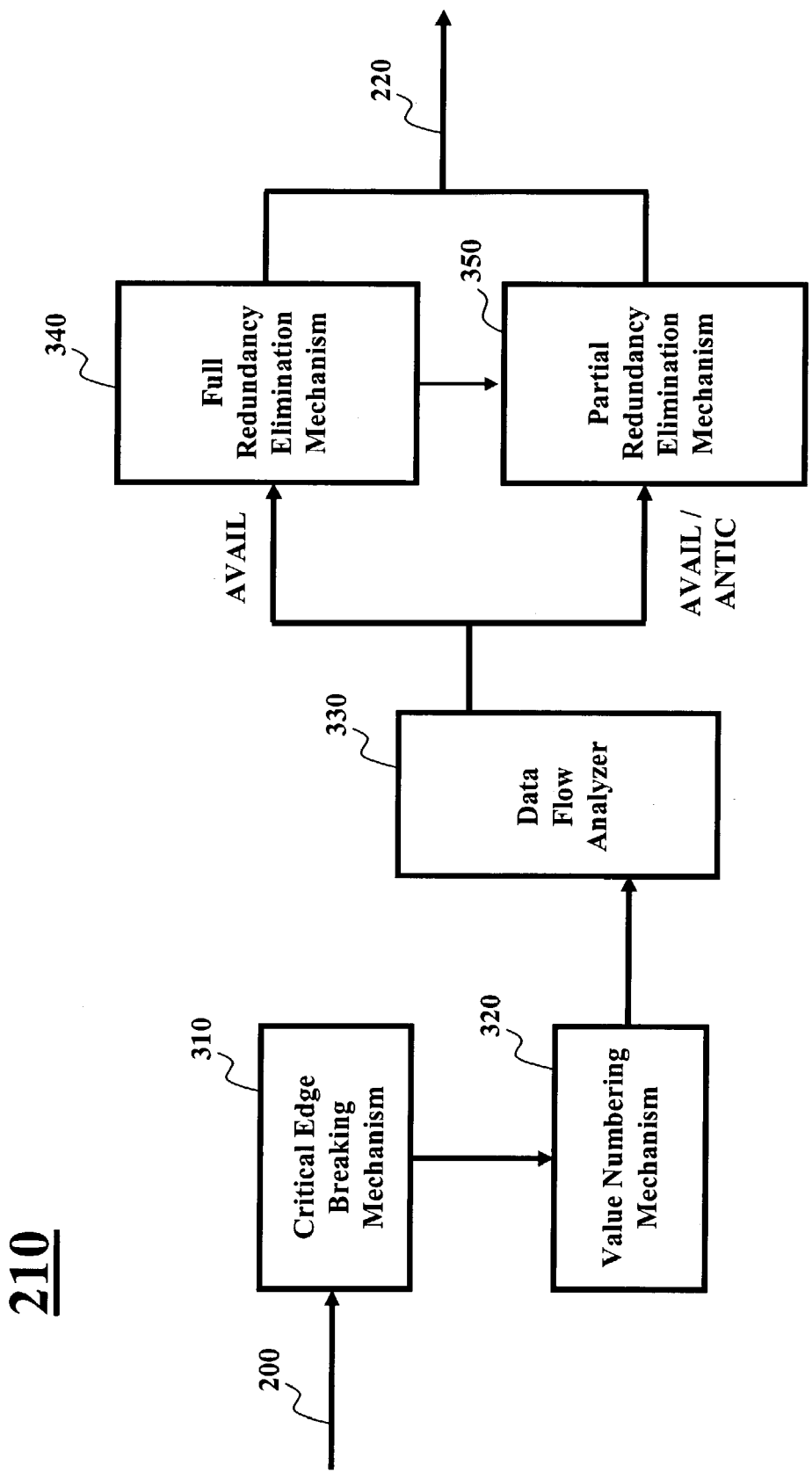
FIG. 3 depicts an exemplary internal high level block diagram of a run-time behavior preserving redundancy elimination mechanism, according to embodiments of the inventions.

FIG. 3 depicts an exemplary internal high level block diagram of the run-time behavior preserving redundancy elimination mechanism 210, according to embodiments of the inventions. The run-time behavior-preserving redundancy-elimination mechanism 210 comprises a critical edge breaking mechanism 310, a numbering mechanism 320, a data flow analyzer 330, a full redundancy elimination mechanism 340, and a partial redundancy elimination mechanism 350.

The operations of the run-time behavior preserving redundancy elimination mechanism 210 may be described in terms of a control flow graph of the original code 200. One exemplary control flow graph is illustrated in FIG. 1(a). In a control flow graph, there are nodes and edges. Each node may represent one or more instructions, statements, or subroutine calls. A directional edge is a link between a tail node and a head node, indicating the flow from the tail node to the head node. An edge may be an incoming edge or a outgoing edge with respect to an underlying node. An incoming edge denotes a flow that goes into the underlying node. For example, the edge between node 2 and node 9 in FIG. 1(a) is an incoming edge with respect to node 9, indicating the flow of computation from node 2 to node 9.

A node in a control flow graph may have more than one edge associated with it. For example, a node may have both an incoming edge and a outgoing edge. The node 2 has an incoming edge and a outgoing edge. A node may also have more than one incoming edge or more than one outgoing edge. As can be seen in FIG. 1(a), node 1 has two outgoing edges, indicating that there is more than one path through which the flow can go after node 1. For instance, if node 1 represents a two way conditional statement (e.g., an IF . . . ELSE statement), it may has two outcomes corresponding to the two outgoing edges. Similarly, node 9 in FIG. 1(a) has more than two incoming edges, indicating that there is more than one path through which the flow goes into node 9. For example, one may correspond to a sequence of computations along a path originated by the IF part of the statement at node 1 and the other may correspond to a path originated by the ELSE part of the statement at node 1.

The critical edge breaking mechanism 310 identifies critical edges in a control flow graph and breaks each of such critical edges by inserting a new node. An edge is defined to be a critical edge if both the initiating node has multiple outgoing edges and the ending node has multiple incoming edges. A critical edge is "broken" by inserting a new node between the initiating node and the ending node. For instance, in FIG. 1(a), node 2 and node 8 are such inserted new nodes on the critical edges that previously existed between node 1 and node 9 as well as between node 7 and node 9.

The numbering mechanism 320 is responsible for performing value numbering. Such value numbering assigns a symbolic name to all definitions that will either compute the same value or exhibit the same run-time behavior such as throw the same exception or fail to terminate. For example, two definitions "x:=5/a" and "y:=5/b" may be assigned a same value number if variable values of "a" and "b" have the same value number. In this case, when "a" and "b" are equal, the quotients are equal in both situations and both will throw a "divided by zero" exception when "a" and "b" are both zero.

A definition is an instruction or a statement that computes the value of an expression and assigns the computed value to a destination. For best results, either the expression or the destination (or both) should be a local non-address-taken variable. Furthermore, the expression should be no more complex than the smallest unit of work that might constitute a partial redundancy that is desirable to eliminate. In cases where the definition is more complex, it may be decomposed into satisfactory form, by introducing new variables or new assignment statements. For example, "b[i]=h(a[i])" may be decomposed into "s=a[i]; t=h(s); b[i]=t", or even further (if an address-of "&" operator and dereference "*" operatore are allowed as: ""s=a[i]; t=h(s); u=&b[i]; *u=t").

The value numbering mechanism 320 ensures that if two definitions behave the same (including in normal conditions as well as in exception conditions), they are assigned the same value number. Any value numbering technique known in the art may be used to implement the numbering mechanism 320. In one preferred embodiment, an aggressive value numbering algorithm is adopted. Using an aggressive numbering algorithm, both function call definitions and non-function call definitions can be processed. In processing a function call definition, the input to a function call corresponds to the set of all locations the called function may read. Such locations constitute a read set of the function. Given two distinct calls to the same function, the proof that the read set is not modified between the calls guarantees that these two calls will behave the same. That is, they will compute the same value, write the same values, and throw the same exceptions. This is true as well for even indirect (or virtual) calls, so long as their targets has the same value number.

The data flow analyzer 330 performs flow analysis based on a control flow graph where all definitions are value numbered. For each unique value number (which may correspond to multiple instances of definitions), the data flow analyzer 330 scans through the underlying control flow graph to identify, for each instance of the definition, its availability status and anticipation status. The availability status of a definition (e.g., corresponding to value number n) of a particular instruction (e.g., k) (i.e., at a particular node, including a node newly added by the critical edge breaking mechanism 310) may be denoted as AVAIL(k,n). This value of AVAIL(k,n) indicates whether the value of a definition with value number n in an instruction k is available at the point of evaluation.

Similarly, the anticipation status of the definition with a value number n of instruction k may be denoted as ANTIC(k,n). The value of ANTIC(k,n) indicates whether the value of a definition with value number n in instruction k will be needed or used after the point of evaluation and whether the definition can be computed at this point. More detailed discussion about establishing these status values is given with reference to FIGS. 4–5.

Based on the detected availability status information (AVAIL) associated with each definition at each node in a control flow graph, the full redundancy elimination mechanism 340 identifies existing full redundancies and then eliminates such identified full redundancy. The partial redundancy elimination mechanism 350 identifies existing partial redundancy based on both the AVAIL and ANTIC status and then eliminates the identified partial redundancy.

Figure 4:
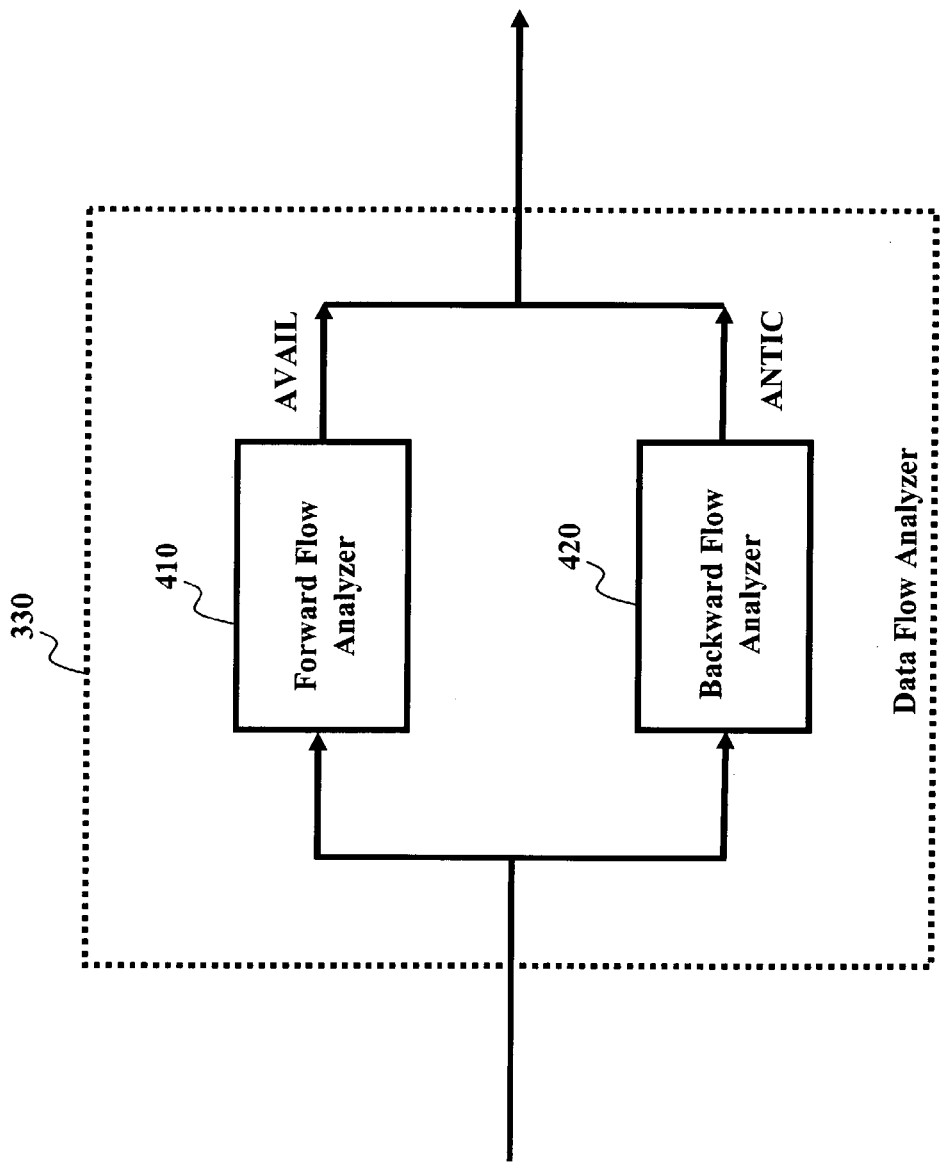
FIG. 4 shows an exemplary internal structure of a data flow analyzer, according to embodiments of the inventions.

FIG. 4 shows an exemplary internal structure of the data flow analyzer 330 in computing the status information related to value numbered definitions, according to embodiments of the inventions. The data flow analyzer 330 comprises a forward flow analyzer 410 and a backward flow analyzer 420. The former carries out a flow analysis in a forward direction with respect to the underlying control flow graph to generate availability status information AVAIL. The latter carries out a flow analysis in a backward direction to generate anticipation status ANTIC.

Figure 5A:
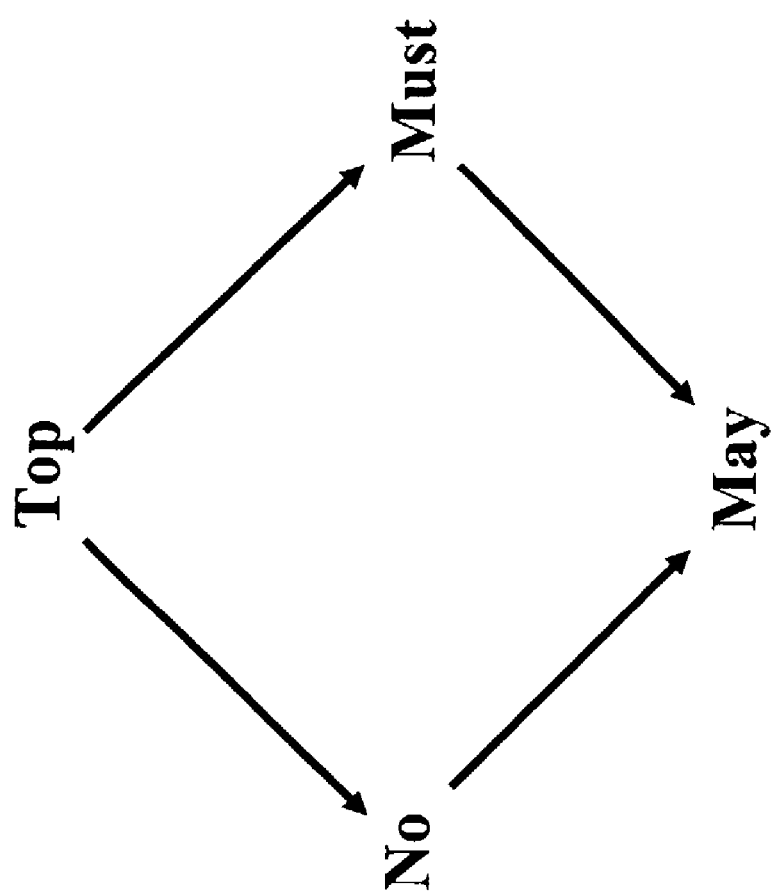
FIG. 5(a) illustrates a four-point diamond lattice.

Both the AVAIL and ANTIC have values indicating the underlying status. AVAIL indicates the availability of the value of a definition at a certain node. That is, it indicates whether the value of the definition has been made available prior to the node. Possible different statuses may include "not available", "may be available", "must be available", or "do not care". On the other hand, the anticipation status of a definition at a certain node indicates whether the value of the underlying definition is needed or used beyond this particular node. Similarly, different status information may include "not used", "may be used", "must be used", and "can not be determined". FIG. 5(*a*) illustrates a four-point diamond lattice containing those four mentioned values, where "top" means "do not care". The meet operator $\cap$ on lattice values denotes "worst case". Below is a table that defines it:

|  |  | Right argument | | | |
| --- | --- | --- | --- | --- | --- |
|  |  | Top | No | Must | May |
| Left argument | Top | Top | No | Must | May |
|  | No | No | No | May | May |
|  | Must | Must | May | Must | May |
|  | May | May | May | May | May |

Figure 1B:
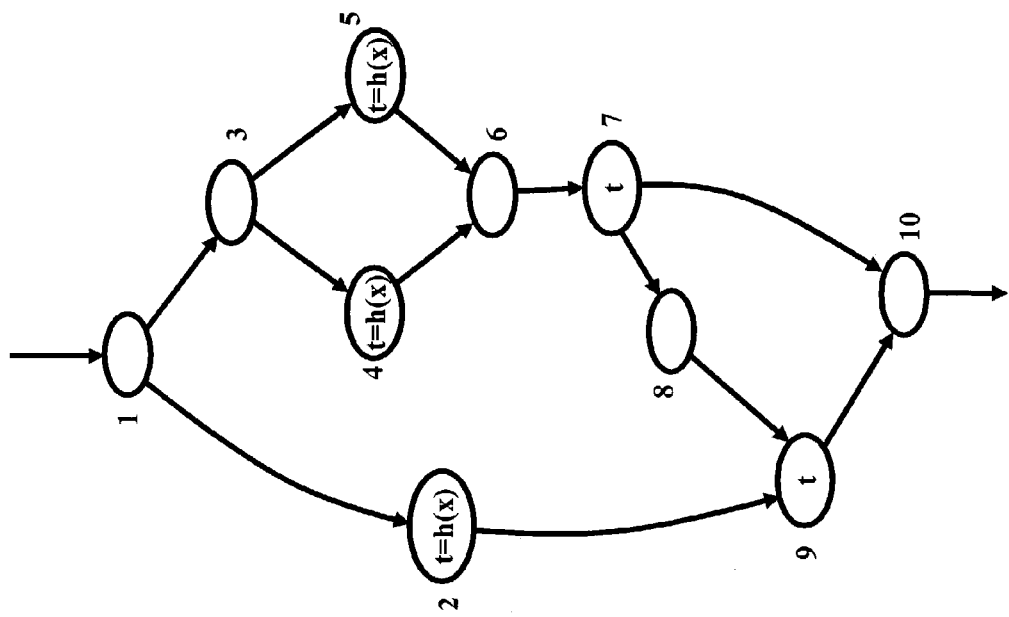
FIGS. 1(a)–(b) (Prior Art) illustrate the problem of redundancy and conventional solutions to remove full and partial redundancies.
Figure 1A:
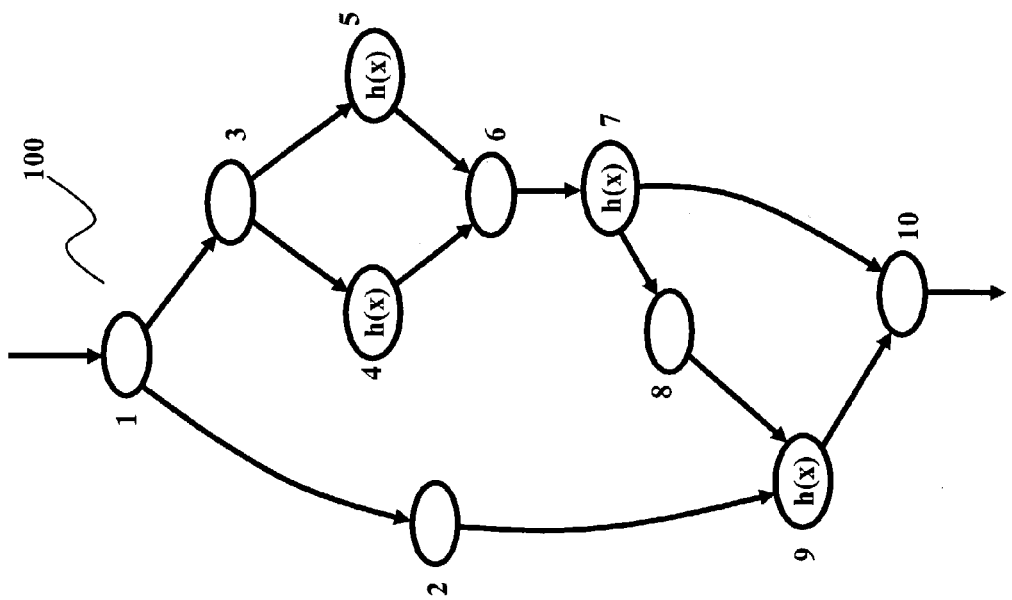

During a forward flow analysis, the forward flow analyzer 410 (FIG. 4) may start from the first (top) node in a control flow graph (e.g., node 1 in FIG. 1(*a*)) and traverses the control flow graph following the direction of the edges. In forward flow analysis, at each node, two availability evaluations are performed. One is at the entrance point of the node or along the incoming edge of the node. This is denoted by $AVAIL_{in}$. The other is at the exit point of the node or along the outgoing edge of the node. This is denoted by $AVAIL_{out}$. The $AVAIL_{in}$ and $AVAIL_{out}$ represent the availability of the value of the associated definition when entering the node and when departing the node, respectively.

The $AVAIL_{out}$ of a node may be determined by the $AVAIL_{in}$ of that node and what computation is performed in the node. For example, if the value of the underlying definition is not changed at the node (i.e., the value is not computed at this node and no location that affects the computation of the value is changed at this node), then the $AVAIL_{out}$ simply inherits the value of $AVAIL_{in}$. When a node has a single incoming edge, the value of $AVAIL_{in}$ is the same as the $AVAIL_{out}$ of the predecessor node (i.e., the initiating node of the incoming edge). When a node has a plurality of incoming edges, the value of the $AVAIL_{in}$ may be determined according to the values of $AVAIL_{out}$ from all of the predecessor nodes. In one preferred embodiment, the values of both $AVAIL_{in}$ and $AVAIL_{out}$ at a particular node may be defined as:

$$AVAIL_{in} = \begin{cases} \text{No,} & \text{if } k \text{ is an entry instruction} \\ \bigcap_{j \in pred(k)} AVAIL_{out}(k, n), & \text{Otherwise} \end{cases}$$

$$AVAIL_{out}(k, n) = \begin{cases} \text{Must} & \text{if } COMP(k, n) \wedge \neg ALTERED(k, n) \\ \text{No} & \text{if } ALTERED(k, n) \\ AVAIL_{in}(k, n) & \text{Otherwise} \end{cases}$$

The value of $AVAIL_{in}$, (k,n) is "no" if instruction k is an entry instruction (e.g., node 1 in FIG. 1(*a*)). If node k is not an entry instruction, the value of $AVAIL_{in}(k,n)$ is computed as the "meet" (i.e., operation $\cap$) of all values of $AVAIL_{out}$ of all the predecessor nodes.

The value of $AVAIL_{out}$ is "Must" if the underlying definition is computed by instruction k (at the node) and the computation does not alter the input used in computing the definition. That is, in this case, we know for sure that the value is available. The value of $AVAIL_{out}$ is "No" if the input used in computing the definition is altered (ALTERED(k,n)= true). Otherwise, the value of $AVAIL_{out}$ simply inherits the value of $AVAIL_{in}(k,n)$ of the same node, since nothing done in this node has changed the availability of the value.

When the backward flow analyzer 420 carries out backward flow analysis, it starts from the last node of a control flow graph (e.g., node 10 in FIG. 1(*a*)) and traverses the control flow graph following the counter direction of the edges. In backward flow analysis, at each node, two anticipation evaluations are performed. One is at the exit point of the node or along the outgoing edge of the node. This is denoted by $ANTIC_{out}$. The other is at the entrance point of the node or along the incoming edge of the node. This is denoted by $ANTIC_{in}$. The $ANTIC_{in}$ and $ANTIC_{out}$ indicate the anticipated need for the value of the associated definition at the node when entering the node and when departing the node, respectively. In one preferred embodiment, the values of both $ANTIC_{in}$ and $ANTIC_{out}$ can be computed as:

$$ANTIC_{in}(k, n) = \begin{cases} \text{Must} & \text{if } COMP(k, n) \\ \text{No} & \text{if } \neg COMP(k, n) \wedge ALTERED(k, n) \\ ANTIC_{out}(k, n) & \text{Otherwise} \end{cases}$$

$$ANTIC_{out} = \begin{cases} \text{No,} & \text{if } k \text{ is an exit instruction} \\ \bigcap_{j \in succ(k)} ANTIC_{in}(k, n), & \text{Otherwise} \end{cases}$$

The value of $ANTIC_{in}(k,n)$ is "Must" if instruction k computes the definition because it must have been possible to compute it at the node. The value of $ANTIC_{in}(k,n)$ is "No" if instruction k does not compute the definition and alters the input used in computing the definition because a value computed before the node would be made obsolete by the alteration of an input that affects its computation. Otherwise, the value of $ANTIC_{in}(k,n)$ is the value of $ANTIC_{out}(k,n)$. The value of $ANTIC_{in}(k,n)$ is "No" if instruction k is an exit instruction. Otherwise, the value of $ANTIC_{in}(k,n)$ is computed as the "meet" (i.e., operation $\cap$) of all values of $ANTIC_{in}$ of all the successor nodes.

The forward flow analysis and the backward flow analysis produces four status values ($AVAIL_{in}(k,n)$, $AVAIL_{out}(k,n)$, $ANTIC_{in}(k,n)$, and $ANTIC_{out}(k,n)$) with respect to each definition having a value number n of each instruction k at each node. Such evaluation status is used in both identifying redundancy (full and partial) and removal of the identified redundancy.

Figure 5B:
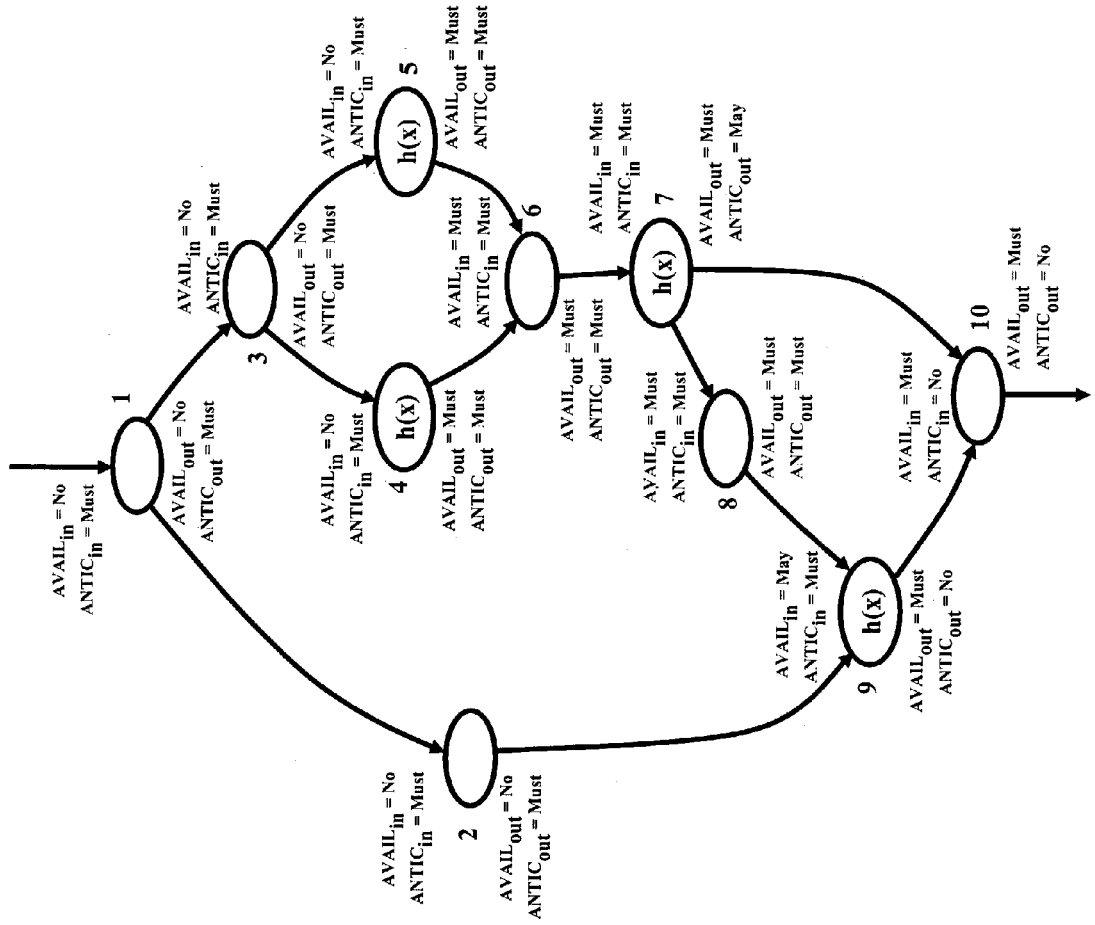
FIG. 5(b) illustrates an exemplary output of a data flow analyzer on an exemplary control flow graph, according to the inventions.

FIG. 5(b) illustrates the computed values of $AVAIL_{in}$, $AVAIL_{out}$, $ANTIC_{in}$, and $ANTIC_{out}$ for each node in an exemplary control flow graph.

Figure 6:
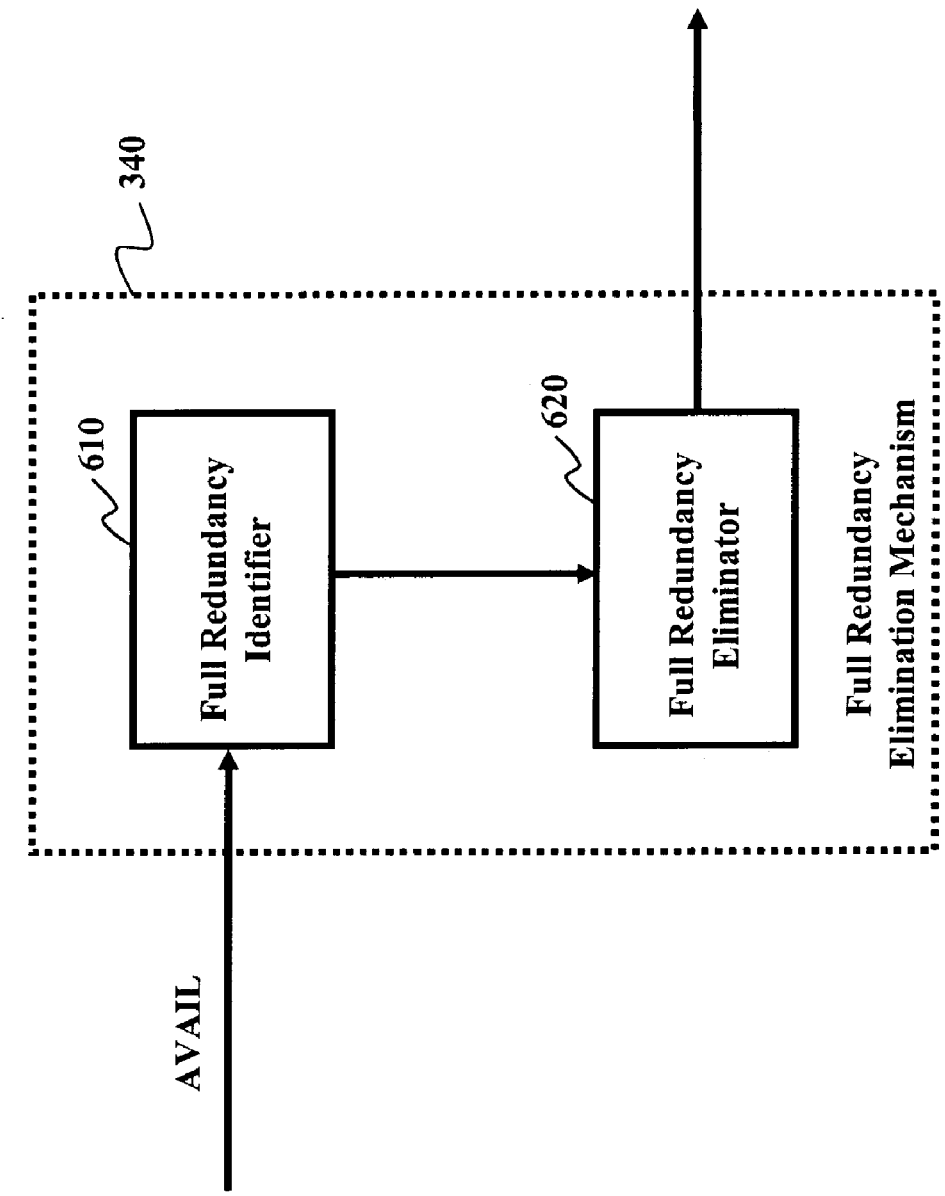
FIG. 6 shows an exemplary internal structure of a full redundancy elimination mechanism, according to the inventions.

FIG. 6 shows an exemplary internal structure of the full redundancy elimination mechanism 340, according to embodiments of the inventions. The full redundancy elimination mechanism 340 comprises a full redundancy identifier 610 and a full redundancy eliminator 620. The former is to identify the locations of full redundancies and the latter is to remove full redundancies from such identified locations. In one preferred embodiment, the full redundancy identifier 610 recognizes full redundancy using a criterion: $AVAIL_{in}$(k,n)="Must". That is, full redundancy exists at node k if the value of a definition with value number n is available for sure when the flow enters the node k. Details related to eliminate full redundancy are discussed with reference to FIG. 9.

Figure 7:
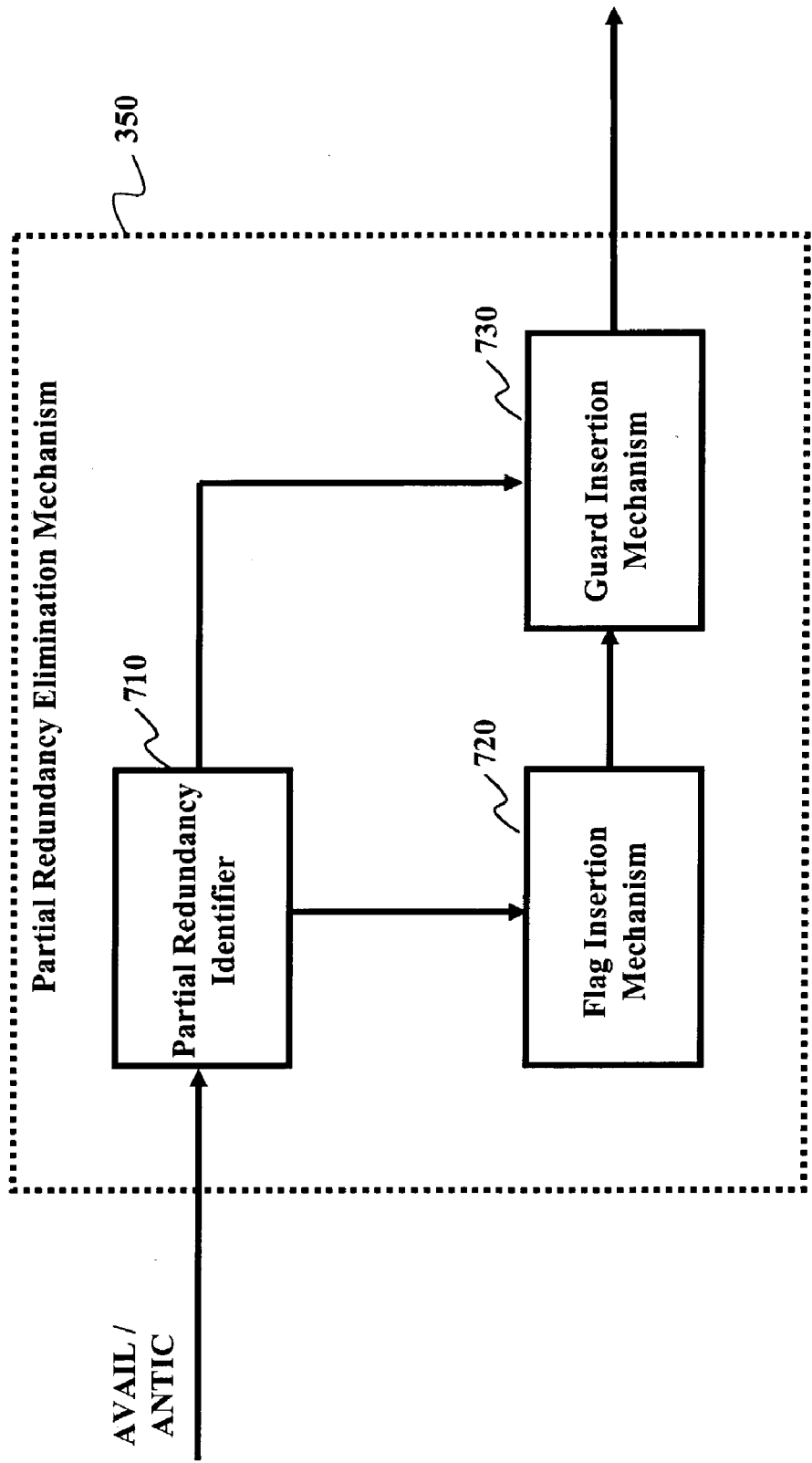
FIG. 7 depicts an exemplary internal structure of a partial redundancy elimination mechanism, according to the inventions.

FIG. 7 depicts an exemplary internal structure of the partial redundancy elimination mechanism 620, according to embodiments of the inventions. The partial redundancy elimination mechanism 350 comprises a partial redundancy identifier 710, a flag insertion mechanism 720, and a guard insertion mechanism 730. The partial redundancy identifier 710 is responsible for locating partial redundancies based on the availability and anticipation status with respect to each definition in each instruction at each node.

The flag insertion mechanism 720 is responsible for initializing necessary values of flags inserted at appropriate nodes to signify the availability of the value of a definition for which partial redundancy has been detected. The guard insertion mechanism 730 is responsible for inserting a guard instruction associated with the inserted flags at a node where partial redundancy is detected. The details related to partial redundancy detection are discussed with reference to FIG. 10.

Figure 8:
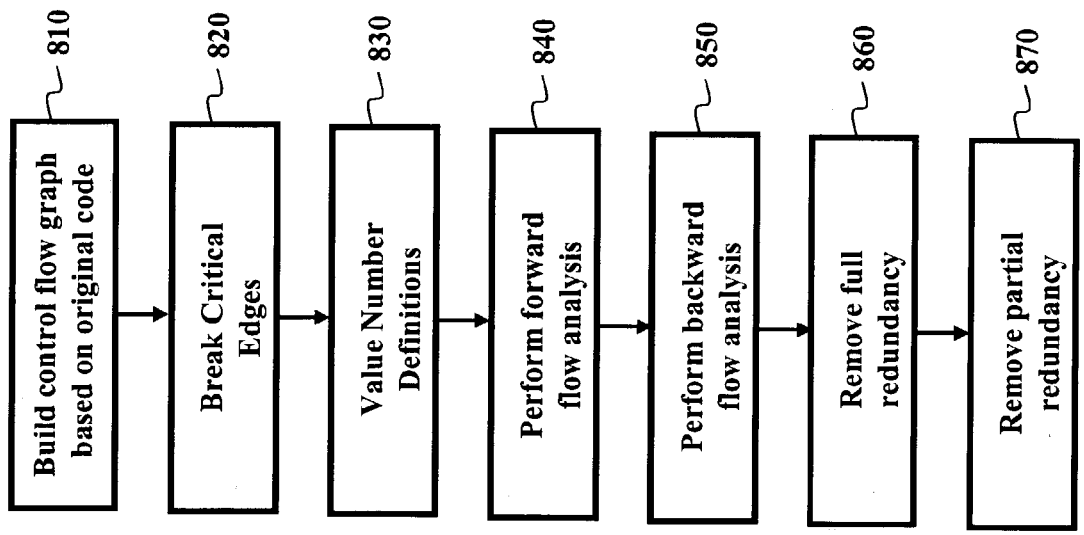
FIG. 8 is a flowchart of an exemplary process, in which redundancy is eliminated in a manner to preserve run-time behavior, according to the inventions.

FIG. 8 is a flowchart of an exemplary process, in which redundancy in code is eliminated in a manner to preserve run-time behavior, according to embodiments of the inventions. A control flow graph is first constructed, at act 810, based on the original code for which redundancy elimination is to be performed. Critical edges in the control flow graph are identified and broken, at act 820, by inserting added nodes. This creates an updated control flow graph.

Value numbering is then performed at act 830. Based on the value numbers, forward flow analysis and backward flow analysis are carried out, at acts 840 and 850, with respect to each unique value number in each instruction. This produces four status values corresponding to the availability and anticipated use of the value of each definition in each instruction, evaluated at both the entry and exit points of the underlying node. Based on these availability and anticipated use status information, full redundancy is removed at act 860 and partial redundancy is removed at act 870. Specifics relating to eliminating full and partial redundancies are discussed below with reference to FIGS. 9 and 10.

Figure 9:
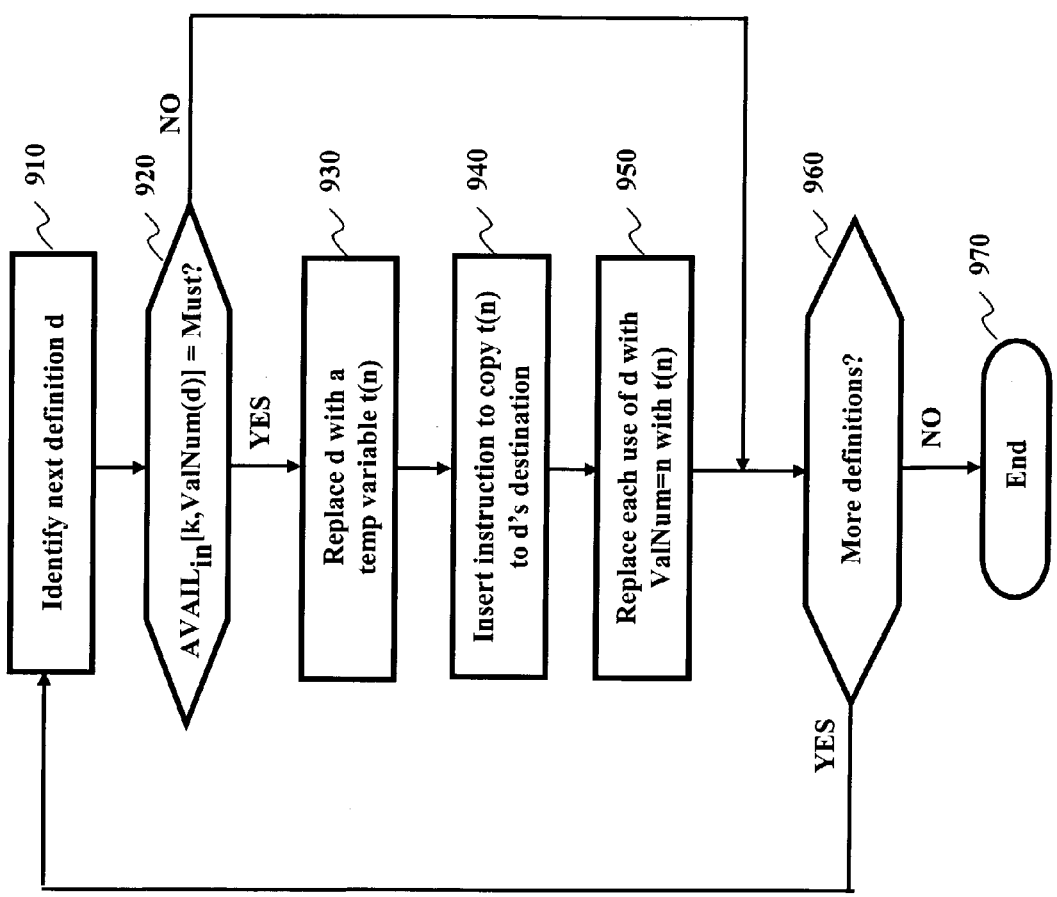
FIG. 9 is a flowchart of an exemplary process, in which full redundancy is identified and eliminated, according to the inventions.

FIG. 9 is a flowchart of an exemplary process, in which full redundancy at a node is identified and eliminated, according to embodiments of the inventions. For each instruction (or at each node of a control flow graph), a definition d having a value number n is first identified at act 910. It is then determined, at act 920, whether the computation of definition d at current node is fully redundant according to the criterion described above. If it is not fully redundant, it is determined, at act 960, whether there are other definitions at this node that need to be examined for full redundancy. If there is at least one definition remaining, the processing returns to act 910 to examine the next definition. Otherwise, the processing for the current node ends at act 970. The processing may proceed to next node (not shown).

Figure 11:
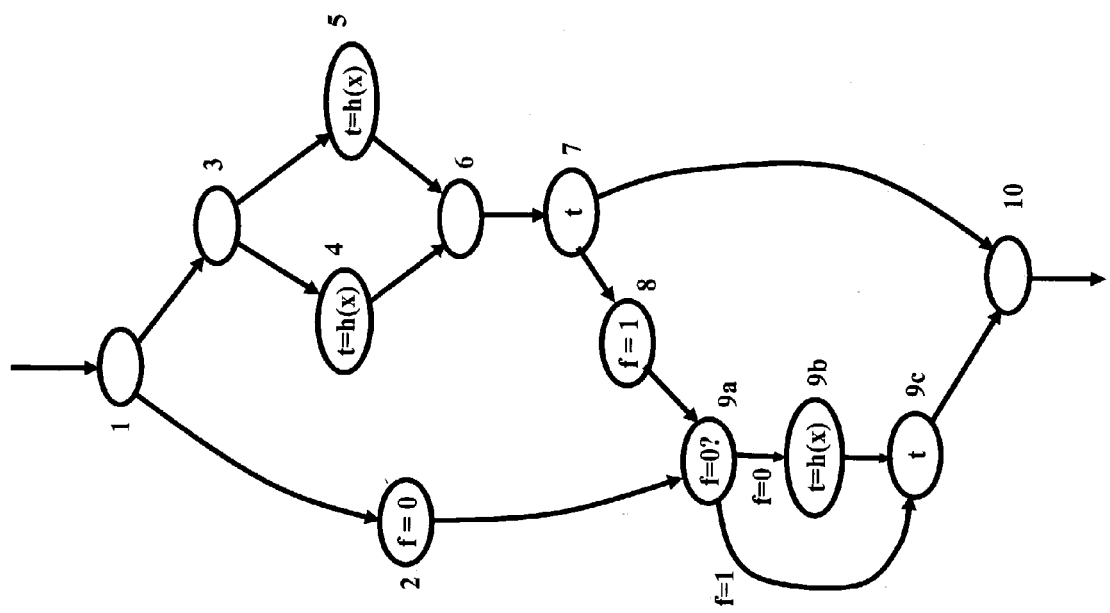
FIG. 11 illustrates an example of run-time behavior preserving redundancy elimination, according to the inventions.

If the computation of definition d is identified as fully redundant, a series of operations are performed to eliminate the redundancy. At act 930, a temporary variable t(n) is used to replace definition d that has value number n. An instruction is then inserted, at act 940, that copies the value of t(n) to the original destination of definition d. Finally, each use of definition d (having the value number n) is replaced, at act 950, using the temporary variable t(n). One example of removing full redundancy is illustrated in FIG. 11. The original control flow graph is shown in FIG. 1(a). There a no critical edges in this example. Definition h(x) computed at node 7 is identified as fully redundant. Instead of computing h(x) again at node 7, the h(x) computed at either node 4 or node 5 are copied to a temporary variable t. Then at node 7, the computation of h(x) is replaced with a reference to temporary variable t.

Figure 10A:
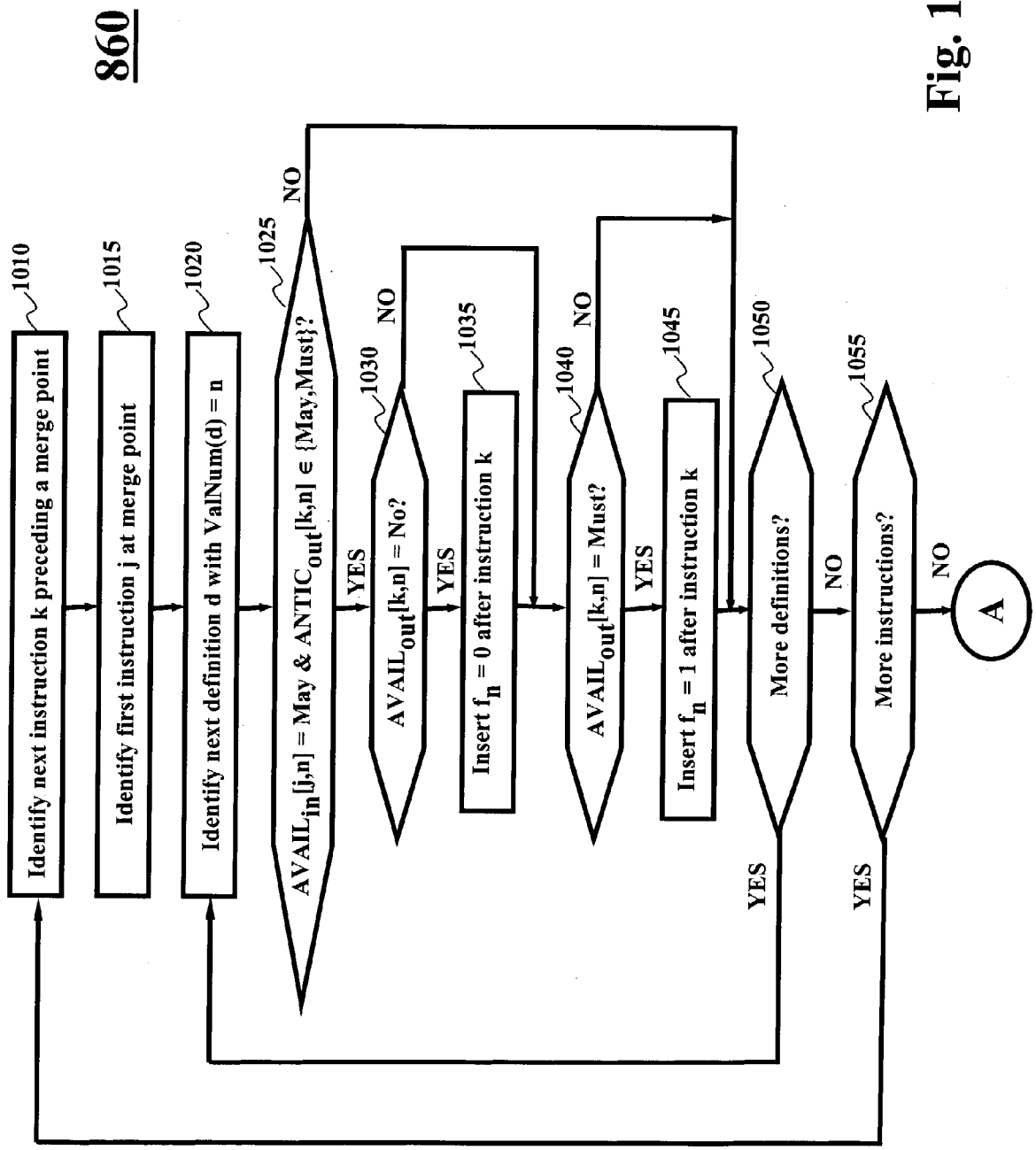
FIG. 10 is a flowchart of an exemplary process, in which partial redundancy is identified and eliminated, according to the inventions.
Figure 10B:
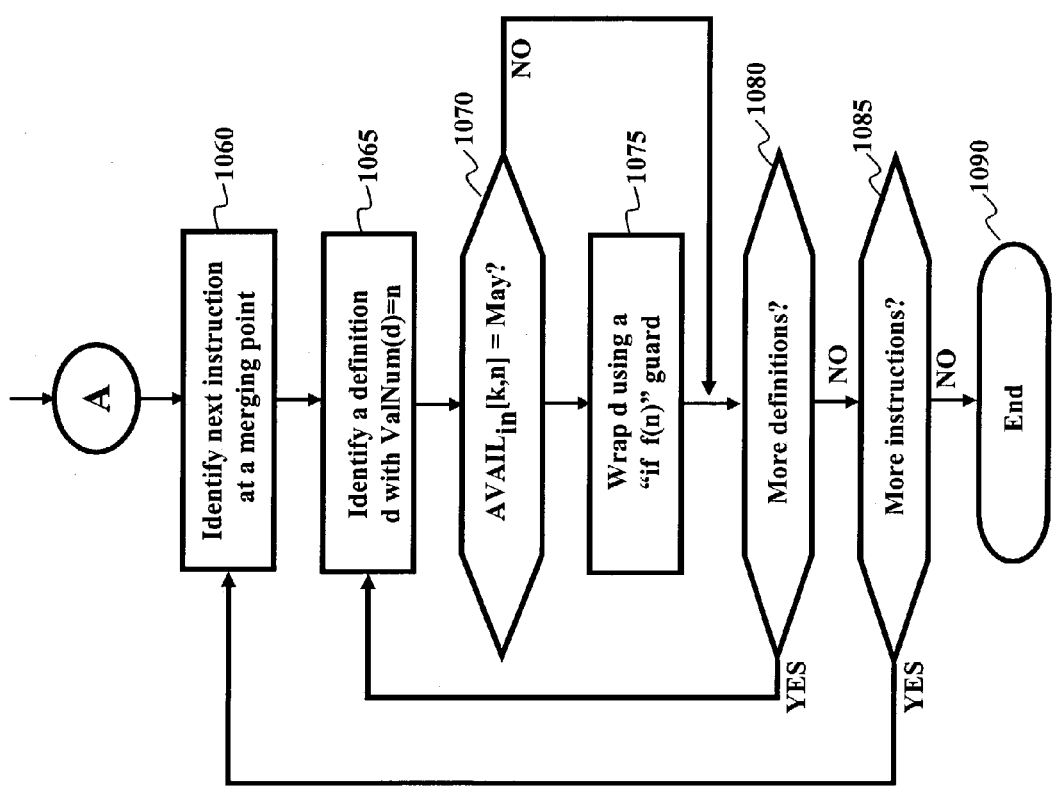

FIGS. 10(a) and 10(b) depict a flowchart of an exemplary process, in which partial redundancy in given original code is identified and eliminated, according to embodiments of the inventions. As may be noted from the figures, the flowchart of FIG. 10(a) and 10(b) is divided at a point between acts 1055 (FIG. 10(a)) and 1060 (FIG. 10(b)). Thus all references to acts 1010–1055 are to FIG. 10(a), and all references to acts 1060–1090 are to FIG. 10(b). First, with reference to FIG. 10(a), an instruction k preceding a merge point is first identified at act 1010. A merge point is a node that has more than one incoming edge. For example, node 9 in the control flow graph shown in FIG. 1(a) is a node at a merge point. A first instruction denoted by j is also identified at act 1015. An instruction preceding this merge point may be an instruction at node 1 or at node 7 (node 2 and 8 are added nodes). With respect to instruction k, a definition d having a value number n is identified at act 1020.

Whether definition d with value number n in instruction k is partially redundant is determined at act 1025. The criterion used to make that decision includes two parts. One is that the value of $AVAIL_{in}$(j,n) is "May", meaning that definition d at the first instruction j at the merge point may be available. The other part is that the anticipated need of definition d at instruction k is either "May" or "Must". When both conditions are satisfied, there is useful partial redundancy to be removed. When only the first condition is satisfied, there is a partial redundancy, but the expression is "useless" and is typically removed by other optimizations within a compiler. When only the second condition is met, there is no redundancy.

If there is no partial redundancy with respect to definition d associated with instruction k, the processing proceeds to act 1050 to determine whether there is another definition associated with instruction k to be examined for partial redundancy. If there is, the processing returns to act 1020 to identify the next definition. If all definitions associated with instruction k have been examined, the processing proceeds to the next instruction, if any. When there are more instructions, the processing returns to act 1010 to identify the next instruction proceeding a merge point.

When partial redundancy exists, a flag is inserted with an initialized value. Since a node at a merge point has more than one incoming edge, depending the availability status $AVAIL_{out}$(k,n), the value of the flag may be set differently. FIGS. 5(b) and 11 together illustrate the point. The value of AVAIL$_{out}$(k,n) at node 2 is "No", determined at act 1030, indicating the value of definition d is not available. In this case, a flag is inserted at node 2 (an added node) with an initial value of zero, representing the fact that definition d's value is not yet computed. This is performed at act 1035. On the other hand, the value of AVAIL$_{out}$(k,n) at node 8 is "Must", determined at act 1040, indicating that the availability of the value of definition d is guaranteed to be available. In this case, a flag is inserted at node 8 (added node) with an initial value of one, performed at act 1045.

After all the definitions in all instructions are processed for detecting partial redundancy and inserting flags, the guard insertion mechanism 730 further inserts a guard at each merge point where partial redundancy exists. Now referring to FIG. 10(b), for each merge point, an instruction (e.g., instruction k) is identified at act 1060. Then for each definition (e.g., definition d) associated with instruction k at the merge point, if the availability of the value of definition d with value number n is not certain (i.e., AVAIL$_{in}$(k,n)= "May"), determined at act 1065, the guard insertion mechanism 730 inserts, at act 1075, a guard for definition d.

A guard for definition d is set up according to the flag inserted along different incoming branches proceeding the merge point. This is illustrated in FIG. 11 in which flags are initialized (i.e., f=0 and f=1) at node 2 and node 8. At merging node 9, a guard is constructed according to the inserted flag f. An "if" conditional instruction is inserted (at a new node 9a in FIG. 11) that examines the value of the flag (i.e., "if f=0"). If the value of f is one, it indicates that the value of definition d (e.g., h(x)=d) has been computed and is available for sure at this point. In this case, the reference to definition d in instruction k is replaced with the variable t(n) (at a second added new node 9c).

If the value of f is zero, it indicates that the value of definition d has not been computed and is not available at this point. In this case, h(x) is computed at a third added new node 9b. In this example, since there is no loop, the value of flag f is not reset to one. In other embodiments of the inventions, the value of flag f may be reset when definition d is a loop invariant in a loop. FIGS. 12 and 13 describe alternative guard constructs in situations that involve loop invariant definitions. The guard insertion mechanism 730 iterates through every definition (at act 1080) of every instruction (at act 1085) and ends the processing at act 1090.

Figure 12C:
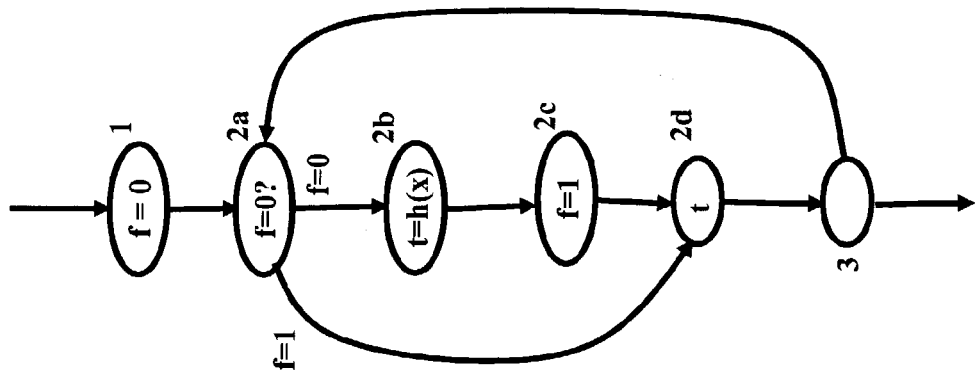
FIGS. 12(a)–(c) illustrate an example of eliminating partial redundancy with respect to a loop invariant in a loop, according to the inventions.
Figure 12B:
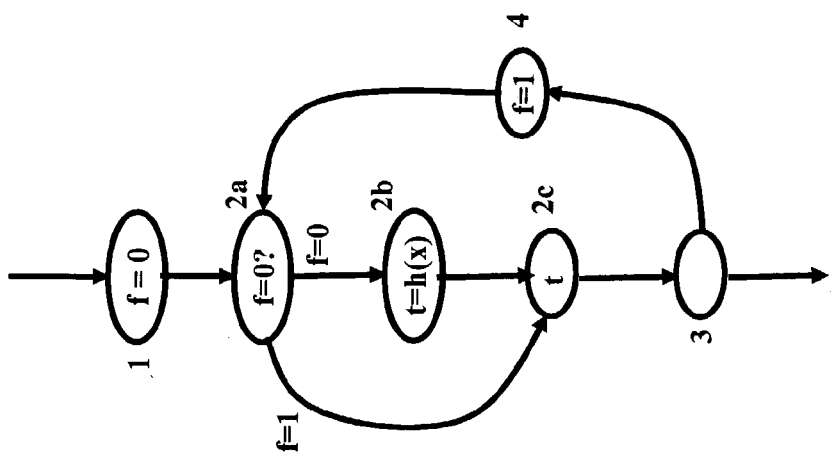
Figure 12A:
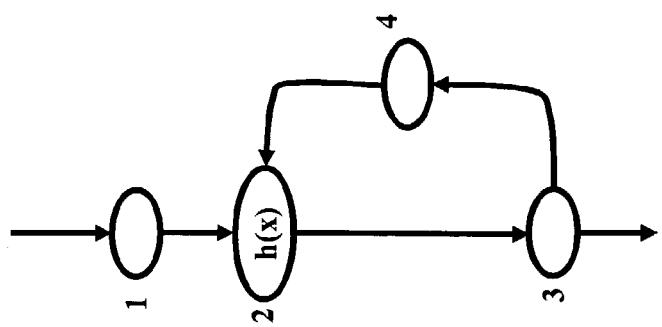

FIGS. 12(a)–(c) illustrate an example of eliminating partial redundancy with respect to a loop invariant in a loop, according to embodiments of the inventions. FIG. 12(a) shows an original control flow graph in which a definition h(x) is a loop invariant yet it is recomputed in every iteration. This is partial redundancy because the first computation is needed but not the rest. FIG. 12(b) shows one solution for eliminating the partial redundancy according to one embodiment. A flag f is inserted before the entrance to the loop with an initial value of zero. Prior art solutions hoist the loop invariant out of the loop. The upward motion of h(x) in such solutions changes the run-time exception or termination behavior.

In FIG. 12(b), a guard is wrapped around node 2 where h(x) is computed in a manner (described above) that preserves the run-time exception and termination behavior of h(x). However, an additional instruction is inserted that sets the value of flag f to one, indicating that h(x) has been computed. Here, the flag is reset outside of the guard. Using this reset flag value, in subsequent iterations, h(x) will not be re-computed. With this solution, the flag may be set in every subsequent iteration. A different alternative shown in FIG. 12(c) is to move the instruction that resets the flag inside the guard. This avoids setting the flag more than once. With this alternative solution, the live range of flag f may be increased.

Figure 13C:
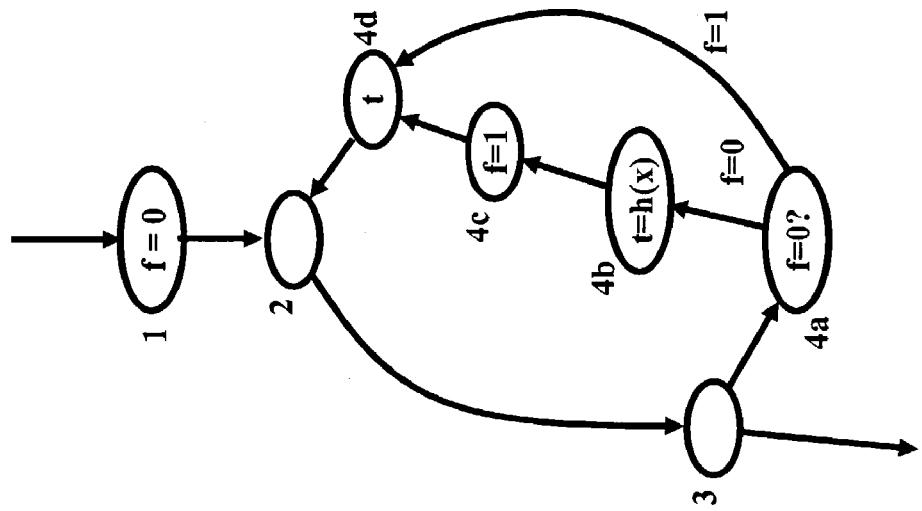
FIGS. 13(a)–(c) illustrate an example of eliminating partial redundancy with respect to a loop invariant in a loop, according to the inventions.
Figure 13B:
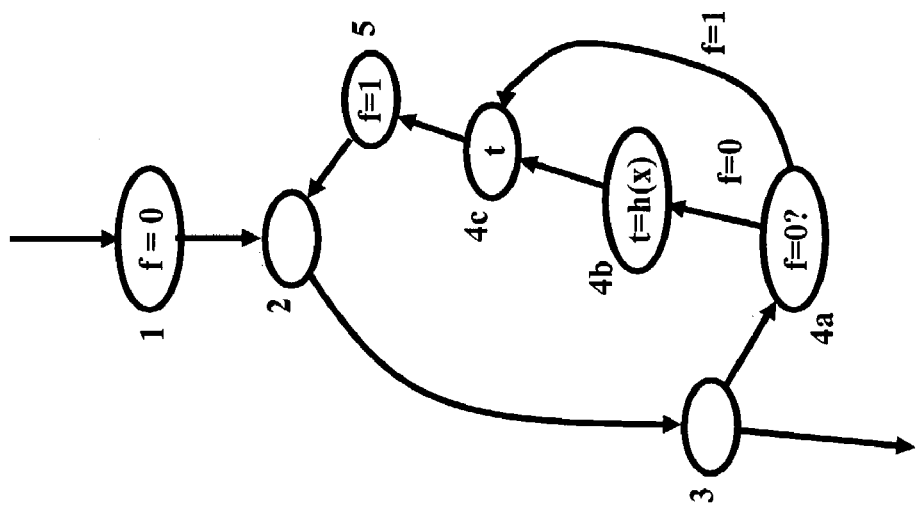
Figure 13A:
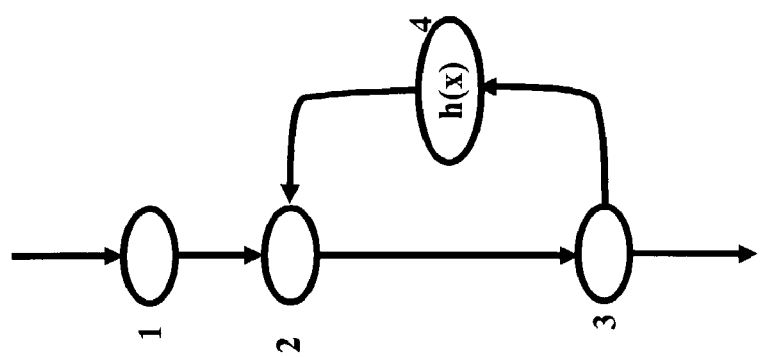

Some loops may have zero iterations. This is illustrated in FIG. 13(a). While node 2 and node 3 form a loop, the loop may never iterate beyond the first trip. Conventional solutions will speculatively compute h(x) before the loop, assign the computed value of h(x) to a temporary variable, and then replace the reference to h(x) with a temporary variable. This changes the run-time exception and termination behavior though. One embodiment of the inventions, as shown in FIG. 13(b), speculatively sets a flag (f=0) before the loop and then wraps the definition h(x) with a guard. The flag is reset (f=1) outside of the guard once definition h(x) has been computed. In an alternative embodiment as shown in FIG. 13(c), the flag is reset inside of the guard to avoid repeated resetting. Similarly, this may increase the live range of flag f.

Figure 14:
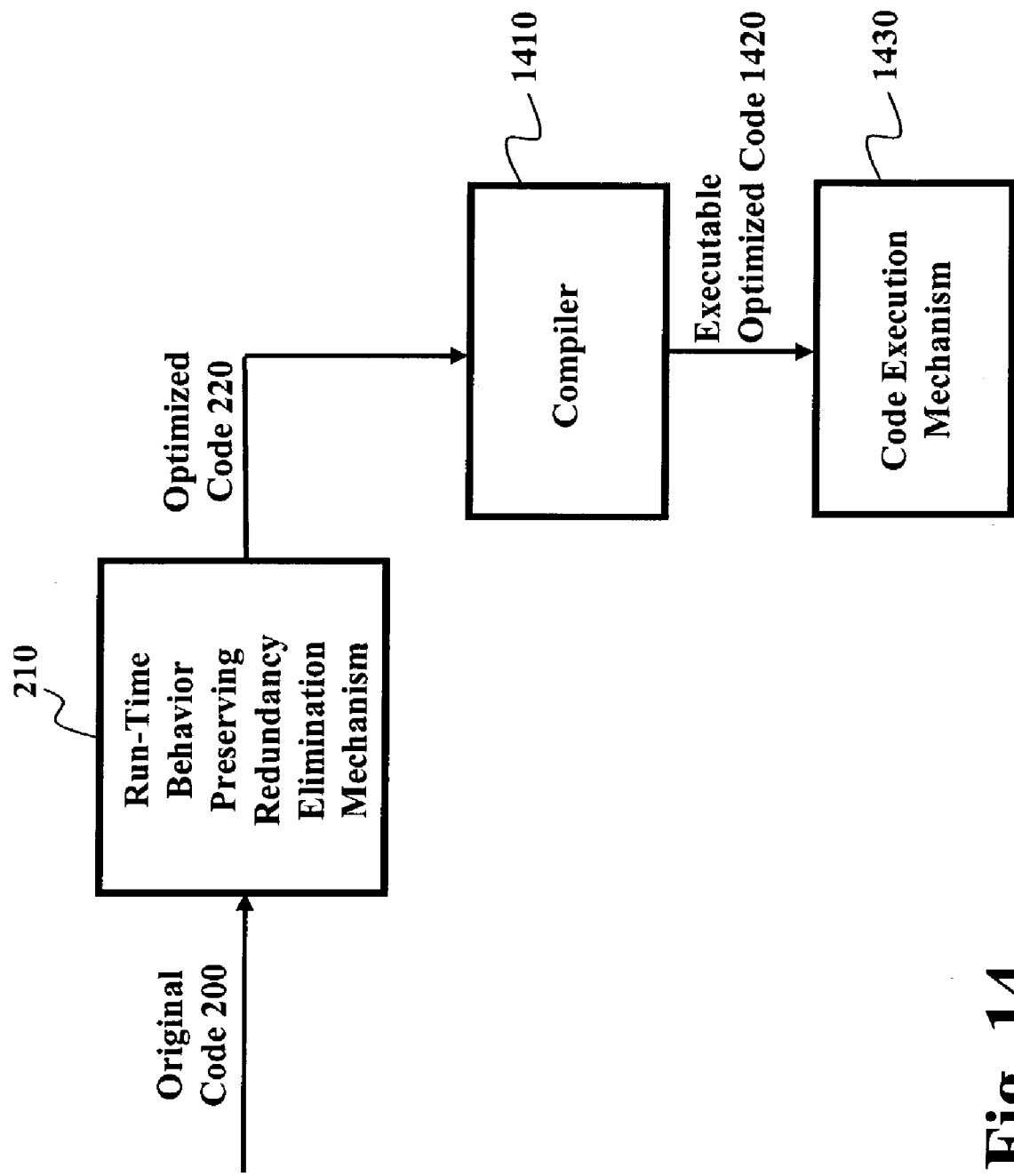
FIG. 14 depicts a framework that uses a run-time behavior preserving redundancy elimination mechanism to derive optimized executable code, according to the inventions.

FIG. 14 depicts a framework that uses a run-time behavior preserving redundancy elimination mechanism to derive optimized executable code, according to embodiments of the inventions. Original code 200 is processed by the run-time behavior preserving redundancy elimination mechanism 210 to produce optimized code 220. A compiler 1410 compiles the optimized code 220 to produce executable optimized code 1420. A code execution mechanism 1430 executes the executable optimized code 1420.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method to transform original code into optimized code, comprising:
    receiving original code;
    setting a flag with a value indicating the availability of a definition of the original code;
    inserting a guard around an instance of the definition, wherein the guard is capable of directing processing according to the value of the flag;
    removing an instruction that, at run-time, possibly throws an exception or fails to terminate;
    numbering each definition in an instruction associated with a node in a control flow graph established based on the original code to produce numbered definitions;
    performing flow analysis on the control flow graph to produce a first pair of values and a second pair of values with respect to each numbered definition in an instruction associated with a node in the control flow graph; and
    eliminating partial redundancy using both the first and the second pair of values, wherein the first pair of values corresponds to AVAILin and AVAILout indicating the availability of the value of the numbered definition before and after the instruction is executed, respectively, and
    the second pair of values corresponds to ANTICin, and ANTICout indicating whether the value of the numbered definition can be anticipated before and after the instruction is executed, respectively, and the values of AVAILin, AVAILout, ANTICin, and ANTICout include top, must, no, and may.

2. The method according to claim 1, wherein said eliminating partial redundancy comprises:
identifying, for each numbered definition, a merge point with a plurality of incoming branches, wherein the value of the AVAILIn of the numbered definition at the merge point indicates that the availability of the value of the numbered definition at the merge point is uncertain;
setting a first value of the flag if the value of AVAILout for the numbered definition indicates that the numbered definition is not available;
setting a second value of the flag if the value of AVA/Lout for the numbered definition indicates that the numbered definition is available; and
placing the guard at the merge point for the numbered definition, wherein the guard directs processing according to the value of the flag.

3. The method according to claim 1, further comprising eliminating full redundancy in the original code according to the first pair of values.

4. A method for run-time behavior preserving redundancy elimination, comprising:
numbering each definition in an instruction at each node of a control flow graph constructed according to original code to produce numbered definitions;
setting a flag with a value indicating the availability of a definition of the original code; and
inserting a guard around an instance of the definition, wherein the guard is capable of directing processing according to the value of the flag; and
removing redundancy in the original code so that the run-time behavior of the original code is preserved, wherein the redundancy elimination includes removing an instruction in the original code that, at run-time, possibly throws an exception or fails to terminate;
performing flow analysis to produce a first pair of values and a second pair of value for each numbered definition in an instruction associated with a node in the control flow graph, wherein the first pair of values, generated in a forward flow analysis, corresponds to AVAILin and AVAILout, indicating the availability of the value of the numbered definition before and after the instruction is executed, respectively, the second pair of values, generated in a backward flow analysis, corresponds to ANTICin and ANTICout indicating whether the value of the numbered definition can be anticipated before and after the instruction is executed, respectively, and the values of AVAILin, AVAILout, ANTICIn, and ANTICout include top, must, no, and may.

5. The method according to claim 4, wherein said removing redundancy comprises eliminating partial redundancy according to the first pair and the second pair of values.

6. The method according to claim 5, wherein said eliminating partial redundancy comprises:
identifying, for each numbered definition, a merge point with a plurality of incoming merging branches, wherein the value of the AVAILin of the numbered definition at the merge point indicates that the availability of the value of the numbered definition at the merge point is uncertain;
setting a first value of the flag if the value of AVAILout for the numbered definition indicates that the numbered definition is not available;
setting a second value of the flag if the value of AVAILout for the numbered definition indicates that the numbered definition is available; and
placing the guard at the merge point for the numbered definition, wherein the guard directs processing according to the value of the flag.

7. The method according to claim 4, further comprising eliminating full redundancy, wherein said eliminating full redundancy includes:
identifying a node at which a numbered definition associated with an instruction is fully redundant;
replacing the numbered definition with a temporary variable;
inserting an instruction, wherein the inserted instruction copies the value of the temporary variable to the destination of the numbered definition; and
replacing each use of the numbered definition with the value of the temporary variable.

8. A system, comprising:
a processor;
a numbering mechanism capable of numbering each definition in an instruction associated with each node of a control flow graph established based on original code;
a data flow analyzer capable of perform flow analysis on the control flow graph to produce a first pair of values and a second pair of values with respect to each numbered definition of each node;
wherein the data flow analyzer comprises:
a forward flow analyzer capable of performing forward flow analysis to produce the first pair of values with respect to each numbered definition associated with an instruction; and
a backward flow analyzer capable of performing backward flow analysis to produce the second pair of values with respect to each numbered definition associated with an instruction, wherein
the first pair of values corresponds to AVAILin and AVAILout indicating the availability of the value of the numbered definition before and after the instruction is executed, respectively,
the second pair of values corresponds to ANTICin and ANTICout indicating whether the value of the numbered definition can be anticipated before and after the instruction is executed, respectively, and
the values of AVAILin, AVAILout, ANTICin, and ANTICout include top, must, not and may; and
a redundancy elimination mechanism capable of removing redundancy in the original code based on the first pair of values and the second pair of values associated with each node to generate optimized code.

9. The system according to claim 8, wherein the redundancy elimination mechanism comprises a partial redundancy elimination mechanism capable of eliminating partial redundancy in the original code according to the first pair and the second pair of values.

10. The system according to claim 9, wherein the partial redundancy elimination mechanism comprises:
a partial redundancy identifier capable of identifying, with respect to a numbered definition, a merge point with a plurality of incoming merging branches, wherein the value of the AVAILin of the numbered definition at the merge point is "No", indicating that the value of the numbered definition at the merge point is not available;
a flag insertion mechanism capable of inserting a flag at the two branches and setting values of the flag; and
a guard insertion mechanism capable of inserting a guard switch at the merge point for the numbered definition, wherein the guard switch directs processing according to the value of the flag, wherein the flag is set to be a first value along a first merging branch, if the value of AVAILout for the numbered definition at the first merging branch indicates that the numbered definition is not available, and the flag is set to be a second value along a second merging branch, if the value of AVAILout for the numbered definition at the second merging branch indicates that the numbered definition is available.

11. The system according to claim 9, further comprising a full redundancy elimination mechanism capable of eliminating full redundancy in the original code according to the first pair of values.

12. The system according to claim 11, wherein the full redundancy elimination mechanism comprises:

a full redundancy identifier capable of identifying a node at which a numbered definition associated with an instruction is fully redundant; and a full redundancy eliminator capable of removing the identified full redundancy of the numbered definition at the node through;

assigning the value of the numbered definition to a temporary variable, inserting an instruction, wherein the inserted instruction copies the value of the temporary variable to the destination of the numbered definition, and replacing each use of the numbered definition with the value of the temporary variable.

13. The system according to claim 8, further comprising:

a compiler capable of compiling the optimized code to generate executable optimized code; and an execution mechanism capable of executing the executable optimized code.

14. An article comprising a storage medium having stored thereon instructions that, when executed by a machine, cause the machine to perform a method to transform original code to optimized code, the method comprising:

receiving original code;

setting a flag with a value indicating the availability of a definition of the original code; and inserting a guard around an instance of the definition, wherein the guard is capable of directing processing according to the value of the flag;

wherein the optimized code is derived after eliminating redundancy from the original code in such a manner that the run-time behavior of the optimized code is the same as the run-time behavior of the original code;

the eliminating redundancy includes removing an instruction that, at run-time, possibly throws an exception or fails to terminate;

numbering each definition in an instruction associated with a node in a control flow graph established based on the original code to produce numbered definitions;

performing flow analysis on the control flow graph to produce a first pair of values and a second pair of values with respect to each numbered definition in an instruction associated with a node in the control flow graph;

removing redundancy in the original code based on the first pair of values and the second pair of values, wherein the first pair of values corresponds to AVAILin and AVAILout indicating the availability of the value of the numbered definition before and after the instruction is executed, respectively, and the second pair of values corresponds to ANTICin, and ANTICout indicating whether the value of the numbered definition can be anticipated before and after the instruction is executed, respectively, and the values of AVAILin, AVAILout, ANTICin, and ANTICout include top, must, no, and may.

15. The article according to claim 14, wherein said removing redundancy comprises eliminating partial redundancy using both the first and the second pair of values, said eliminating partial redundancy including:

identifying, for each numbered definition, a merge point with a plurality of incoming branches, wherein the value of the AVAILin of the numbered definition at the merge point indicates that the availability of the value of the numbered definition at the merge point is uncertain;

setting a first value of the flag if the value of AVAILout for the numbered definition indicates that the numbered definition is not available;

setting a second value of the flag if the value of AVAILout for the numbered definition indicates that the numbered definition is available; and placing the guard at the merge point for the numbered definition, wherein the guard directs processing according to the value of the flag.

16. The article according to claim 14, the instructions, when executed by a machines, further result in eliminating full redundancy in the original code according to the first pair of values.

17. An article comprising a storage medium having stored thereon instructions for run-time behavior redundancy elimination that, when executed by a machine, result in the following:

numbering each definition in an instruction at each node of a control flow graph constructed according to original code to produce numbered definitions;

removing redundancy in the original code so that the run-time behavior of the original code is preserved, wherein the redundancy elimination includes removing an instruction in the original code that, at run-time, possibly throws an exception or fails to terminate;

setting a flag with a value indicating the availability of a definition of the original code; and inserting a guard around an instance of the definition, wherein the guard is capable of directing processing according to the value of the flag; and performing flow analysis to produce a first pair of values and a second pair of value for each numbered definition in an instruction associated with a node in the control flow graph, wherein the first pair of values, generated in a forward flow analysis, corresponds to AVAILin and AVAILout, indicating the availability of the value of the numbered definition before and after the instruction is executed, respectively;

the second pair of values, generated in a backward flow analysis, corresponds to ANTICin and ANTICout indicating whether the value of the numbered definition can be anticipated before and after the instruction is execute, respectively; and the values of AVAILin, AVAILout, ANTICin, and ANTICout include top, must, no, and may.

18. The article according to claim 17, wherein said removing redundancy comprises eliminating partial redundancy according to the first pair and the second pair of values, said eliminating partial redundancy including:

identifying, for each numbered definition, a merge point with a plurality of incoming merging branches, wherein the value of the AVAILin of the numbered definition at the merge point indicates that the availability of the value of the numbered definition at the merge point is uncertain;

setting a first value of the flag if the value of AVAILout for the numbered definition indicates that the numbered definition is not available;

setting a second value of the flag if the value of AVAILout for the numbered definition indicates that the numbered definition is available; and placing the guard at the merge point for the numbered definition, wherein the guard directs processing according to the value of the flag.

19. The article according to claim 17, the instructions, when executed by a machine, further result in eliminating full redundancy, wherein said eliminating full redundancy comprises:

identifying a node at which a numbered definition associated with an instruction is fully redundant;

replacing the numbered definition with a temporary variable;

inserting an instruction, wherein the inserted instruction copies the value of the temporary variable to the destination of the numbered definition; and replacing each use of the numbered definition with the value of the temporary variable.

* * * * *